US011836252B2

United States Patent
Strogov et al.

(10) Patent No.: US 11,836,252 B2
(45) Date of Patent: Dec. 5, 2023

(54) MACHINE LEARNING THROUGH ITERATIVE MEMORY ANALYSIS FOR MALWARE DETECTION

(71) Applicant: Acronis International GmbH, Schaffhausen (CH)

(72) Inventors: Vladimir Strogov, Singapore (SG); Alexey Malanov, Singapore (SG); Sergey Ulasen, Singapore (RU); Vyacheslav Levchenko, Saint Petersburg (RU); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 271 days.

(21) Appl. No.: 17/304,641

(22) Filed: Jun. 23, 2021

(65) Prior Publication Data

US 2022/0414214 A1    Dec. 29, 2022

(51) Int. Cl.
G06F 21/56    (2013.01)

(52) U.S. Cl.
CPC ........ *G06F 21/56* (2013.01); *G06F 2221/034* (2013.01)

(58) Field of Classification Search
CPC .. G06F 21/56; G06F 2221/034; G06F 21/563; G06F 21/566; G06F 21/562; G06N 20/00
See application file for complete search history.

(56) References Cited

U.S. PATENT DOCUMENTS

| 7,636,856 | B2 | 12/2009 | Gheorghescu et al. | |
| 9,959,407 | B1* | 5/2018 | Li | G06F 21/56 |
| 2015/0096022 | A1 | 4/2015 | Vincent et al. | |
| 2017/0262633 | A1* | 9/2017 | Miserendino | G06N 5/025 |
| 2020/0004961 | A1* | 1/2020 | Prokudin | G06F 21/567 |
| 2020/0267170 | A1* | 8/2020 | Mohanta | G06N 20/00 |
| 2021/0240826 | A1* | 8/2021 | Kutt | G06N 20/00 |

FOREIGN PATENT DOCUMENTS

| KR | WO 2019245107 A1 | 12/2019 |
| WO | 20190245107 | 12/2019 |

OTHER PUBLICATIONS

European Patent Office, European Search Report, dated Feb. 12, 2022 (EP 21 02 0458).
Awan Saba et al, Detection of Malicious Executables Using Static and Dynamic Features of Portable Executable (PE) File, Nov. 10, 2016, Springer International Publishing AG, 2016 (Germany).
Awan Saba et al: "Detection of malicious Executables Using Static and Dynamic Features of Portable Executable (PE) File", Nov. 10, 2016 (Nov. 10, 2016), Advances in Biometrics : International Conference, ICB, 2007, Seoul, Korea, Aug. 27-29, 2007; Proceedings; [Lecture Notes in Computer Science; Lect.Notes Computer], Springer, Berlin, Heidelberg, pp. 48-58, XP047361732, ISBN: 978-3-540-74549-5 [retrieved on Nov. 10, 2016].
European Search Report EP21020458, dated Feb. 11, 2022.

* cited by examiner

*Primary Examiner* — Ali S Abyaneh
(74) *Attorney, Agent, or Firm* — ESPE Legal Consultancy FZ-LLC

(57) ABSTRACT

A system and method of anti-malware analysis including iterative techniques. These techniques are used to create a file attribute tree used by a machine learning analyzer to identify malicious files.

8 Claims, 5 Drawing Sheets

MACHINE LEARNING THROUGH ITERATIVE MEMORY ANALYSIS FOR MALWARE DETECTION

TECHNICAL FIELD

The invention pertains to computer security, including static and dynamic analysis and detection of malware.

BACKGROUND

In computer security, malware detection strategies can be classified according to when they intervene in malware execution. These include Pre-Execution, Execution, and Post-Execution strategies. Although Pre-Execution ("PE") analysis is often useful, it has difficulty with a wide set of encrypted or packed malware samples.

One problem is lack of resolution in terms of using PE analysis for such encrypted or packed samples. Common methods use behavioral runtime methods and event collection. PE analysis is not used fully in such cases and the detection rate is not improved by it.

The term static analysis refers to program-analysis techniques based on software structure. Classical static-analysis methods parse and disassemble portable executable files and create attributes trees, including certificates, headers, libraries, imports, name, size and other attributes. These trees are used to classify executable files as malicious. But typical static file analyzers struggle when malware is encrypted. Due to this encryption, code cannot be analyzed effectively with static analysis.

Where static analysis is not effective, dynamic analysis may be used as an alternative. The object of dynamic analysis is to test an untrusted file by executing it in a safe environment so that the file's true nature will be revealed at run-time. Examples of traditional dynamic behavior-analysis tools include emulation, sandboxing, and similar methods.

An emulator can deeply analyze an application, but they have some limitations. Emulators cannot emulate an original system with 100% accuracy. Some malware can test the runtime environment and stop execution if an emulator is detected. Further, emulators use system resources and take substantial time for analysis. This is well known and some malicious files contain dummy loops to extend runtime and emulation time. These loops cause the emulator to quit the analysis before the malicious code executes.

A sandbox is an isolated secure environment that is used for file execution testing and analysis. Like an emulator, a sandbox does not exactly match the target computing system and execution of potentially malicious files in a sandbox may vary from execution in the target environment. Sandboxing is also a resource-intensive process that cannot be done efficiently in a real-time environment. Still, sandboxing can be used in addition to more lightweight static analysis methods.

A system behavior analyzer is a method of controlling execution of the file on a target computer. It traces the API-calls, threads, read and write operations, and all other operations that help to detect malware. The problem is that such methods are not lightweight. They load the system and degrade performance.

SUMMARY

To overcome the problems found in the prior art, static and dynamic analysis can be combined to analyze potentially malicious files, including encrypted files. For example, during static analysis, the entropy of the file body can be estimated in order to make a preliminary conclusion that the file is suspicious, since many data blocks are encrypted. After reaching a preliminary verdict, dynamic methods are used to increase verdict accuracy. Dynamic methods reveal the nature of untrusted files by revealing their execution behavior. For example, if a file overwrites its own header when it begins to execute or has other attributes that conceal its nature, this observed behavior contributes to the conclusion that the file is malicious. Classification can be based on machine-learning technologies.

Various systems level interceptors are used with special control flow points, such as Thread/Process Creation, File mapping etc., that allows re-estimation of the verdict for an application. The re-estimated verdict, given by a trained machine learning PE analysis model, uses the data extracted from the application memory, not from the on-disk file. In this context, application memory includes new code regions where the decrypted code runs. Several iterations are used to achieve increasingly more accurate results. One method uses the synergy of static and dynamic analysis to achieve more precise verdicts than are possible using conventional methods.

The method employs a PE analyzer service, a driver, file system, and requests to the file system. The driver communicates with the user-mode service, which invokes a PE model evaluation and gets an updated PE analyzer verdict. The driver can utilize the user mode hook to define the control point in the code flow to re-estimate the model.

New code regions with unpacked or decrypted code are detected using stack analyzers and user-mode hooks that work with the process virtual memory API. These new code regions are added to the dataset of the model to train the model or calculate the new verdict.

Alternatively, new code regions are collected within Portable Executable uninitialized data segments. Such uninitialized data segments, also called "BSS" segments, act as placeholders for uninitialized variables that do not require any actual disk space.

The same combination of driver and user mode hooks is used to train the PE analysis model with the set of packed or encrypted malware samples. Updated PE analyzer verdicts are used by the endpoint security product to achieve improved malware detection.

In an embodiment of the invention, an antimalware scan of the file is performed upon running an executable file on a target computing system. Static analysis of the file is performed with a tree of file attributes by which files are classified as malicious with a specified accuracy. Dynamic file analysis is performed iteratively if static analysis does not allow classifying the file with the specified accuracy. Dynamic analysis includes intercepting the operation of decrypting data blocks during the execution of the file code and updating the tree of file attributes taking into account encrypted data blocks. Then static analysis of the file is performed again based on the updated tree of file attributes. The steps of intercepting and updating the file are repeated until the file is classified with the specified accuracy.

In an embodiment, data blocks are decrypted in existing memory allocated for an application, a new buffer in allocated memory or in an existing buffer of application. Buffer is a temporary storage area, usually a block in memory, in which items are placed while waiting to be transferred or modified from an input device or to an output device, or from other memory blocks for processing.

In an embodiment, the steps of intercepting data block decryption and updating the file-attribute tree are repeated more than three times, more than five times, or more than ten times.

In an embodiment, the analysis of a file depends on a second untrusted file that was modified from that file after execution. Second untrusted file is a result of execution of the first file, when headers, data blocks or file body of the first file are changed or a new file is created.

In an embodiment, execution of the file is frozen following analysis of additional file data.

In an embodiment, a given area of a buffer is made executable and execution is switched to the given area.

DETAILED DESCRIPTION

Figure 1:
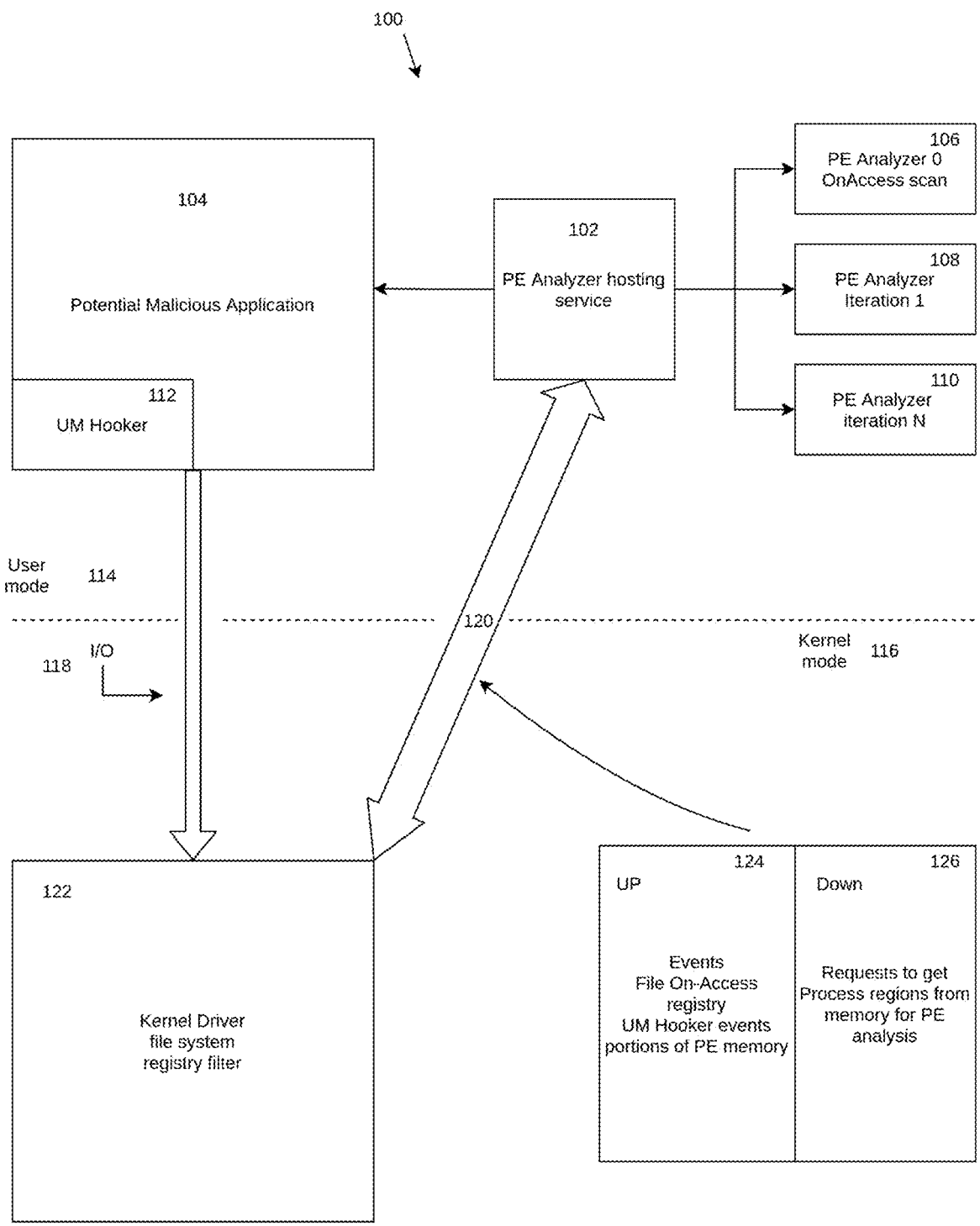
FIG. 1 shows an overview of a system for implementing PE analysis.

Implementation of iterative malware analysis uses static and dynamic techniques to overcome obstacles to detection. These obstacles are embedded into malware by its creators, who are well aware of detection methods used by antimalware systems.

Iterative analysis is designed to use static and dynamic techniques selectively to improve detection rates and thereby overcome anti-detection properties found in sophisticated malware. For example, when the main malicious code in an untrusted file is executed, it may include ways to avoid detection. Dynamic methods such as emulation and sandboxing can be evaded if the malware can detect a virtualized runtime environment that does not match its target environment. Another detection-evasion tactic used by malware is obfuscation. Obfuscation takes code and makes it unreadable by conventional means. It also delays detection and makes the code less susceptible to reverse engineering. Packing is a type of obfuscation used by malware using a packer. A packer is a tool that modifies the formatting of code by compressing or encrypting the data.

Encrypted or packed files require different from traditional known from prior art malware analysis protocols. Executing encrypted malware begins with loading and running a suspected malicious file. In the typical case, the nature of the file cannot be determined with sufficient accuracy because the body is encrypted or packed. To overcome this, data blocks are decrypted in a new buffer of allocated memory. Or data blocks may be decrypted in an existing buffer, making the given area executable and switching execution to the given area. This cycle can have many iterations before the malicious code starts to execute. Decryption therefore proceeds in stages by data blocks read from encrypted data blocks and written to existing application memory or to a new buffer.

Alternatively, uninitialized data segments (BSS) are used for decryption. Packing often targets executable files. The packing process may generate a new header and transform the original file. The transformed original file is copied to the new file. A stub is added to the new file. Where the file is an executable, the stub reverses the transformation during execution.

Microsoft Windows program files use Portable Executable format. This format was first introduced in Windows NT 3.1 and extensions have been made for additional binary formats including .NET and 64-bit support. This is the standard binary format for EXE and DLL files in Windows OS. Linux Executable and Linkable Format ("ELF") is a similar format for executable files in Linux environments. In the following descriptions, Windows formatting will be used for purposes of illustration but the techniques described may be used with any file format that is structurally similar.

Process hollowing is a method of executing code in the address space of a live process. This is commonly performed by creating a process in a suspended state and then unmapping or "hollowing" its memory. This can take place within uninitialized data segments (BSS). Detection can be achieved by setting the execution bit so that the containing directory can be accessed.

Portable Executable header overwriting is a technique used by malware at run-time to avoid detection. For example, the original file comprises a header, a code section, and other sections, such as .data or .rsrc. During the packing process, a completely new executable file may be generated with a new header. The original file may be transformed by compression or encryption or a combination of both. During loading, the packed file starts and is mapped to virtual memory. The unpacking stub is called to reverse the compression or cryptographic operations as required. The original file is then restored in memory, now with a new header. When a file header is changed at run-time, this is evidence that the file at issue was packed.

Static and dynamic analysis techniques affect overall system performance differently. For example, a static PE analyzer can classify the Portable Executable file (PE-file) when it has decrypted data of the PE-file loaded in memory more quickly and efficiently than dynamic analysis of the same file while achieving a high detection rate.

FIG. 1 shows an overview of a system 100 for implementing PE analysis.

Antimalware system 100 includes a PE analyzer hosting service 102 for analyzing potential malicious application 104. PE analyzer service 102 generates on-access scan 106 as iteration 0 and continues with iterations 1 (108) to N (110). These elements and user-mode UM hooker 112 are located in user mode 114.

Kernel mode 116 includes kernel driver 122 that operates Input and output I/O commands from the UM hooker 112 and link 120 between results 122 of the UM hooker 112 and PE analyzing service 102. Link 120 passes results 124 up to PE analyzer 102. Requests 126 down from PE analyzing service 102 include requests for process regions from memory for PE analysis. User mode is distinguished from kernel mode in that applications run in user mode, while core operating system components run in kernel mode.

Figure 2:
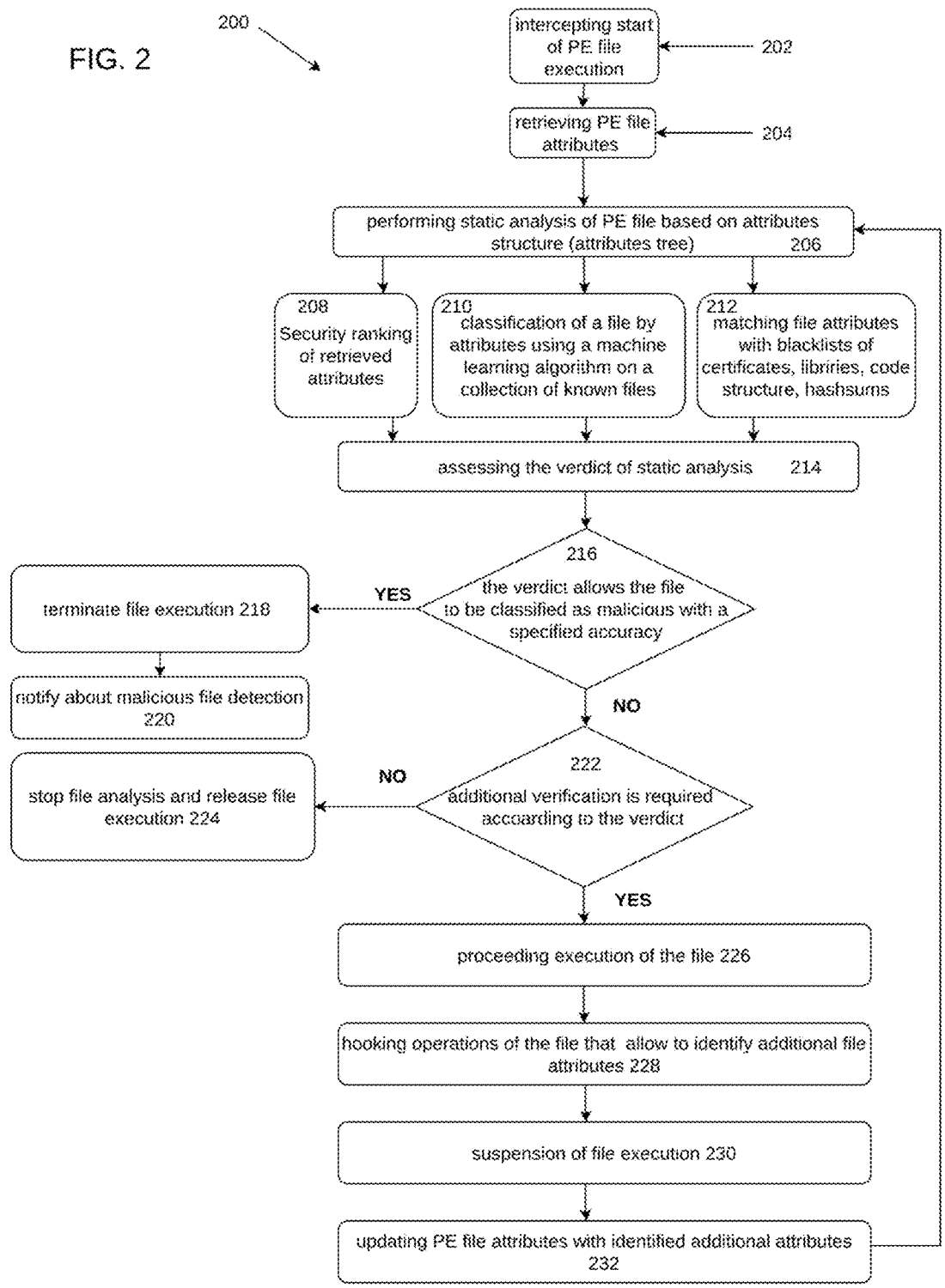
FIG. 2 shows the steps for performing iterative static-dynamic analysis of an unknown object.

FIG. 2 shows method 200 for performing iterative static-dynamic analysis of an unknown file.

The process begins by intercepting the start of file execution at step 202 and then retrieving file attributes at step 204. Based on these attributes, static analysis is performed at step 206. The preliminary results of static analysis generate a security ranking 208, file classification by attributes using machine-learning algorithm on a collection of known files 210 and allow for matching 212 of file attributes with known malware from blacklists of suspect certificates, libraries, code structure, and hashsums.

The result of ranking 208, classification 210, and matching 212 is verdict 214 of static analysis. This verdict may or may not be sufficiently accurate to classify the file in question according to a predetermined confidence level (or specified accuracy). The confidence level can depend on a security policy and the class of file. For example, a high level of security should correspond to a confidence level of no more than one percent of type I errors, and a moderate level of safety should correspond to a confidence level of no more than one percent of type II errors. If it is determined at step 216 that the verdict allows for classification as malware with a specific accuracy, then file execution is terminated at step 218 and the detection of the malicious file is recorded at step 220. If the verdict 214 does not allow for classification, then a determination is made at step 222 about whether any additional verification is required in accordance with the verdict 214. If not, then file analysis is stopped and the file released for execution at step 224.

Additional verification is required when malware cannot be identified with a specific accuracy by way of a security ranking 208, file classification 210, or matching 212 of file attributes with known malware from blacklists of suspect certificates, libraries, code structure, and hashsums. When additional verification is required for classifying the file, for example when confidence level is less then predefined level, or when other malware detection engines provide different verdict of classifications, the iterative process begins at step 226 with a portion of the file being executed. Hooking operations are used at step 228 to identify additional file attributes. Hooking operations alter or augment the executing application by intercepting function calls or messages or events passed between software components. The code used for this purpose is generally known as a hook.

File execution is stopped at step 230 and the previously collected PE-file attributes from static analysis generated at step 206 are updated at step 232. For iterative analysis, execution is stopped so that a single file's execution may be tested up to N times without having to fully execute all code associated with the file in question.

Figure 3:
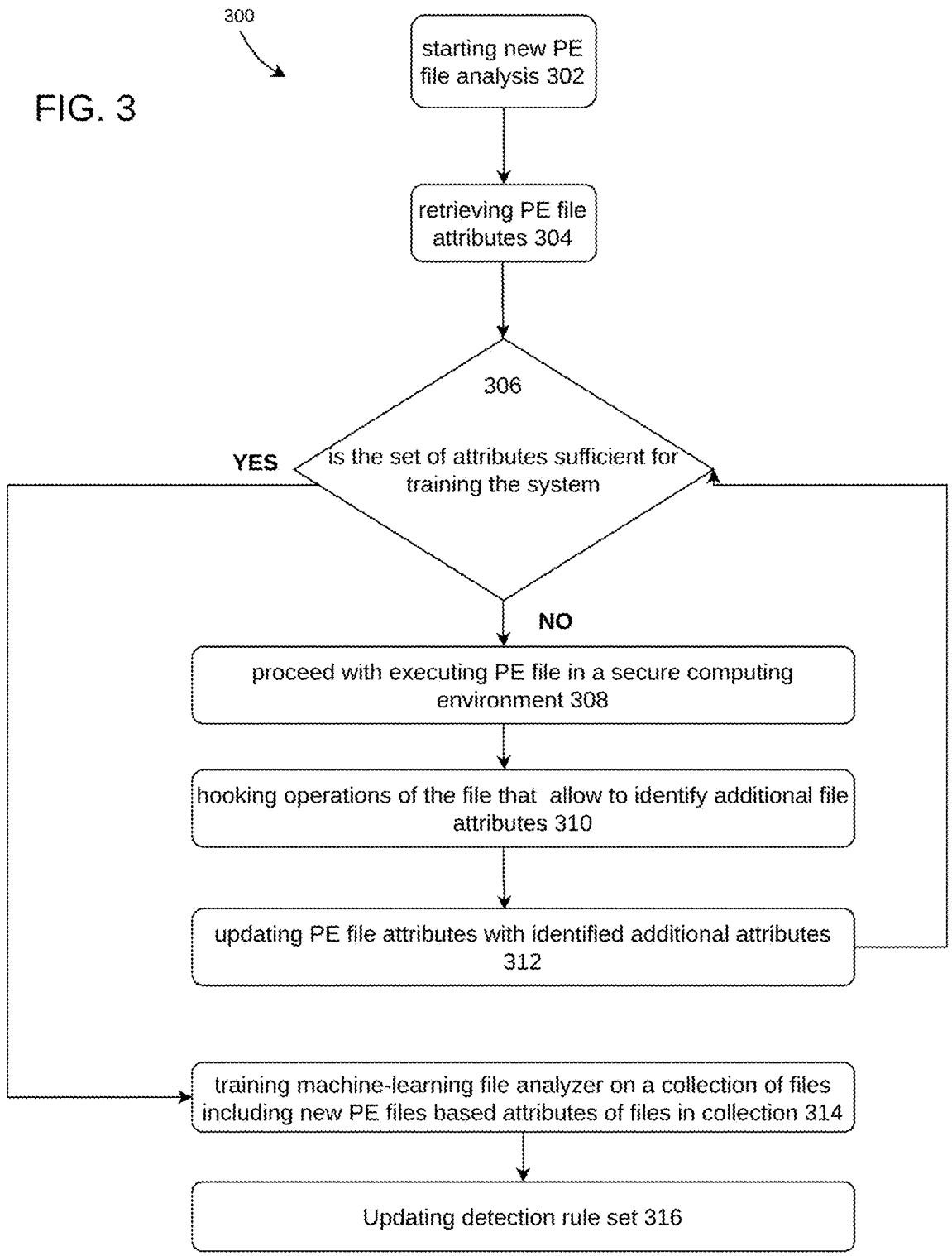
FIG. 3 shows the steps for performing iterative static-dynamic analysis of an unknown object in the context of machine learning.

FIG. 3 shows method 300 for performing iterative static-dynamic analysis of an unknown file in the context of machine learning.

The process begins at step 302 when a new PE-file analysis starts. PE-file attributes are received at step 304 and evaluated at step 306 to determine whether the attribute set is sufficient, for example when the attribute set allows to classify the file with a confidence level more than predefined or consist of minimum valuable set of attributes, for training the system to identify the file in question. If not, then at step 308 the PE-file is executed in a secure computing environment. Examples of secure computing environments include an emulator, a sandbox, a dedicated testing machine, a machine disconnected from any network, or other environments where malware's ability to propagate is limited. Hooking operations are performed to identify additional file attributes at step 310. These additional attributes are used at step 312 to update the original set of attributes. The iterative process continues until the evaluation at step 306 produces a positive result. When a positive result is achieved, a machine-learning file analyzer is trained on collected files at step 314, including new PE-file-based collected attributes. The collected files and attributes are used to update a detection rule set at step 316.

Figure 4:
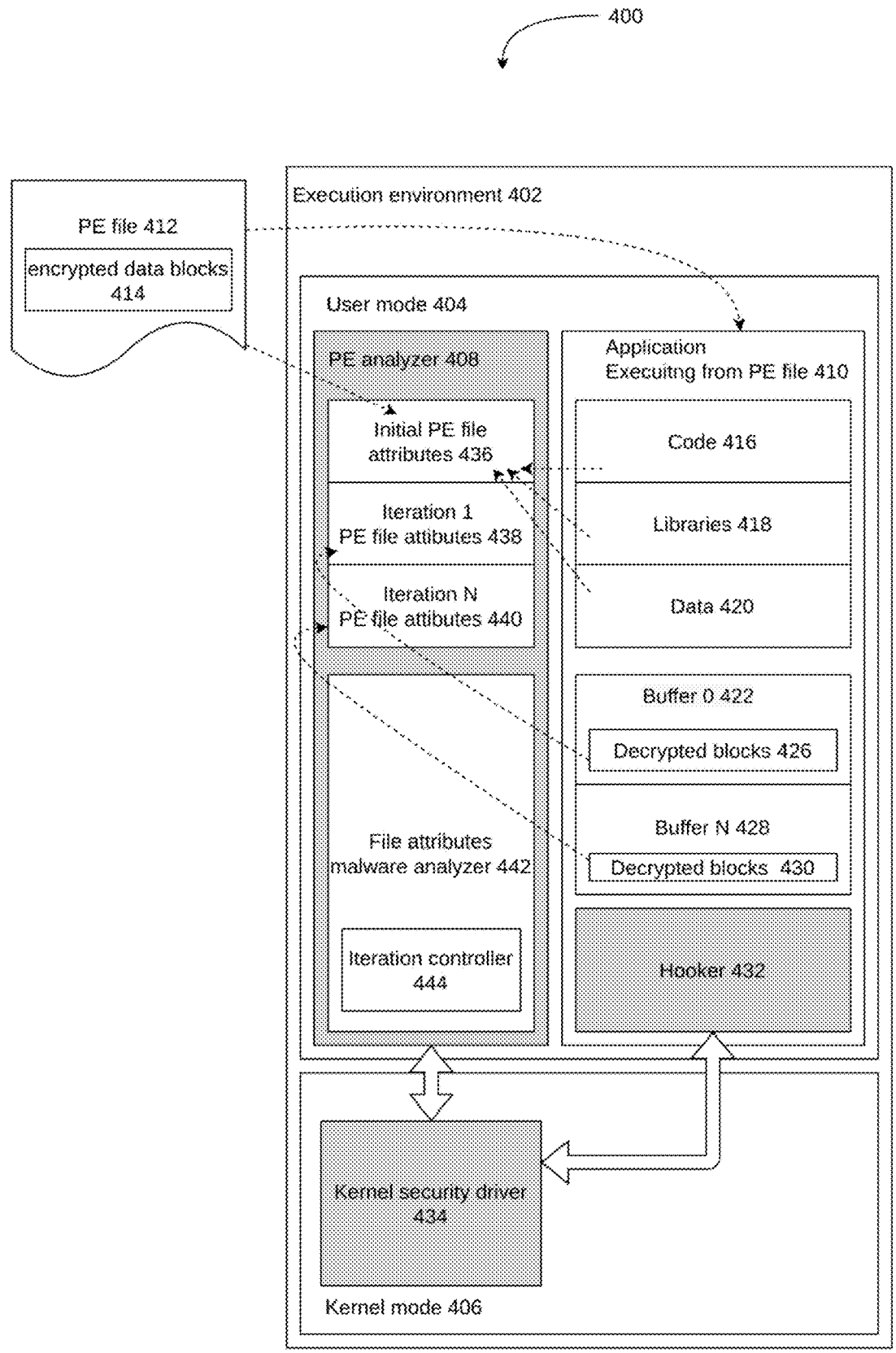
FIG. 4 shows details of an embodiment of iterative static-dynamic analysis performed in an execution environment.

FIG. 4 shows details of an embodiment of iterative static-dynamic analysis 400 performed in an execution environment 402. This environment includes system objects operating in user mode 404 and kernel mode 406: PE analyzer 408 and application 410 running in user mode 404, and kernel security driver 434. User mode is distinguished from kernel mode in that applications run in user mode, while core operating system components run in kernel mode. Application 410 executes from PE-file 412, which includes encrypted data blocks 414. As application 410 executes, it reveals code 416, libraries 418, and data 420. Block decryption takes place iteratively in buffer 0 (422), which executes decrypted blocks 426, and continues moving up to buffer N (428) and decrypted blocks 430. Alternatively, block decryption can take place in data block 420.

Hooker 432 operates in user-mode 404 under control of kernel security driver 434. As in other embodiments, hooker 432 alters or augments the executing application by intercepting function calls or messages or events passed between software components and transmits them to kernel security driver 434 that sends a command or message or event to PE analyzer 408.

Initial PE-file attributes 436 are collected by PE analyzer 408 along with first-iteration collected PE-file attributes 438 through the steps of N-iteration-collected PE-file attributes 440. File attributes malware analyzer 442, directed by iteration controller 444, evaluates initial PE-file attributes 436 and iteratively collected file attributes 438, 440.

Some malware does not create a buffer to decrypt blocks. In such cases, data can be decrypted in existing memory pages. For example, code block 416 and data block 420 are used for decryption.

Although some unpacked files restore the original file in memory, malware may also restore the original file to a different memory address. In such cases, the activity related to the second file is analyzed, focusing on the modification from the first file at the initial step, immediately after starting.

An alternative technique freezes further execution of a file after additional data, like data blocks, headers, code blocks or data written to the application buffer is obtained. For example, all threads of the process may be frozen.

Iterative collection of PE-file attributes using dynamic methods continues until a tree of file attributes is created that is sufficient to reach a conclusion about the file in question.

Figure 5:
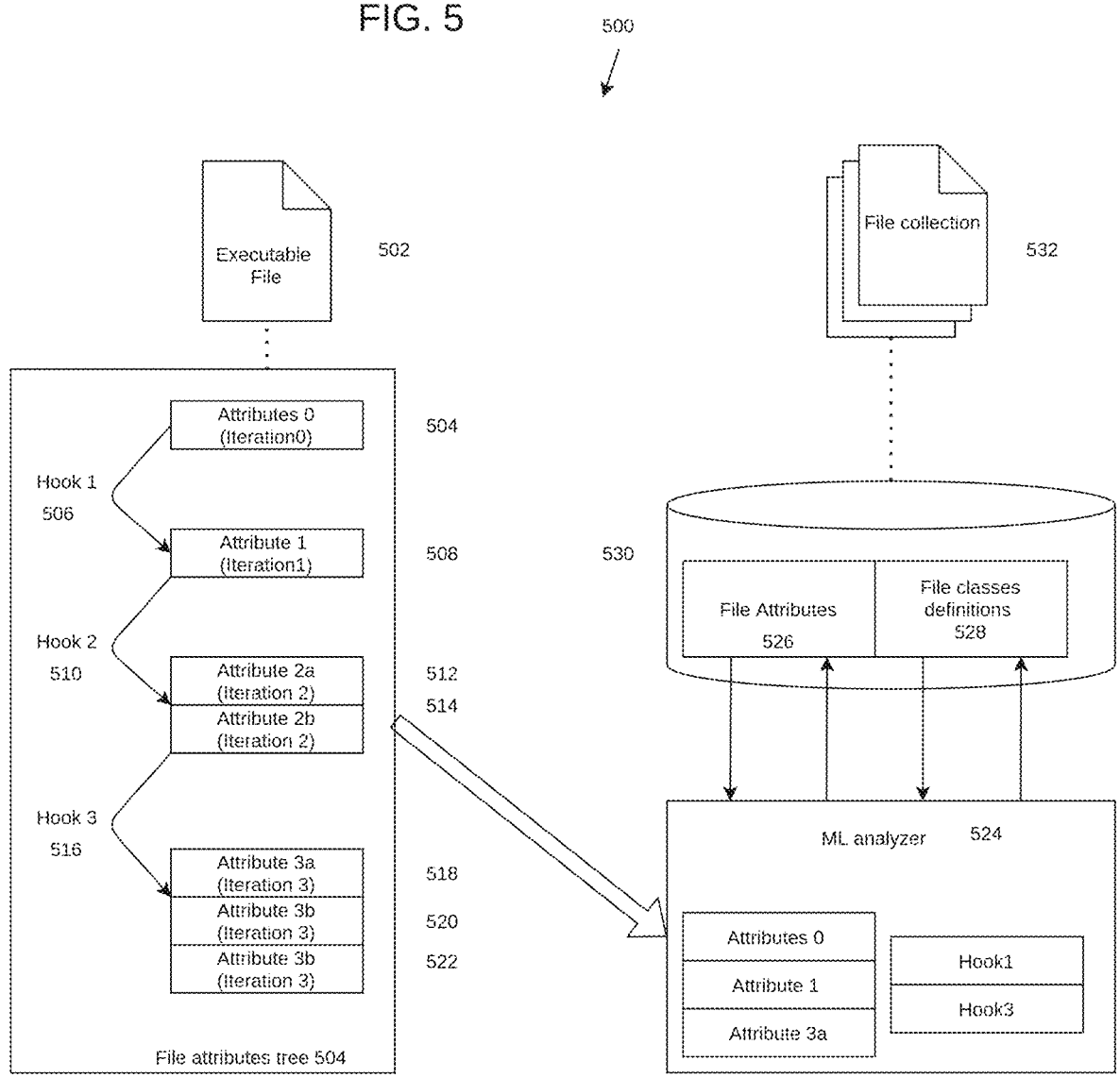
FIG. 5 shows an embodiment of machine learning based on iterative static-dynamic analysis performed in an execution environment.

An implementation 500 of the invention for machine learning is shown in FIG. 5. An executable file 502 has its attributes collected in file attributes tree 504. In the tree are collected the original static file attributes 504. A first hook 506 is applied and a first attribute 508 is recovered. A second hook 510 follows iteratively and recovers attributes 512, 514. A third hook 516 recovers attributes 518, 519, and 529. Thus, in three iterations the file attribute tree is expanded with six additional attributes for analysis. In an embodiment, the number of hooks applied to the executable file is three or more.

The hooked attributes are sent to machine learning analyzer 524 for analysis. For example, original attribute 0 is sent to analyzer 524 along with the results of hook 1 and 3. File attributes 526 and file class definitions are stored in database 430, which is used to make decisions about the trustworthiness of executable file 502. File collection 532 is used as a basis for comparison with known files. As machine learning analyzer 524 reaches conclusions about executable file 502, these conclusions and a record or copy of executable file 502 are added to file collection 532.

The iterative techniques described above are applicable to computing environments where user machines or networks are likely to encounter malware with the ability to evade detection, especially with the ability to evade detection in ways that render static analysis unreliable or incomplete.

The invention claimed is:

1. A computer-implemented method for training a machine-learning static analyzer based on iterative executable file analysis, the method executed on a processor, the method comprising the steps of:
   a. retrieving file attributes from an untrusted file;
   b. creating an attributes tree of the untrusted file's attributes;
   c. performing iteration of dynamic analysis of the untrusted file including decryption of at least one encrypted data block of the untrusted file by intercepting an operation of decrypting the at least one encrypted data block during an execution of the untrusted file's code and updating the tree of the file attributes for the untrusted file based on the at least one decrypted data block;
   d. repeating step (c) until the file's code has been executed;
   e. training machine learning static analyzer based on the updated file attributes tree of the untrusted file and a classified files collection;
   f. analyzing the untrusted the and a second untrusted file, wherein the second untrusted file was modified from the untrusted file after the execution; and
   g. repeating the steps of intercepting and updating at least three times, wherein updating at least three times expands the file attributes tree with six additional attributes for analysis.

2. The method of claim 1, further comprising the step of decrypting data blocks in new or existing memory.

3. The method of claim 2, further comprising the step of freezing the execution of the file following analysis of additional file data.

4. The method of claim 3, further comprising the step of decrypting data blocks of the untrusted file in new or existing memory.

5. The method of claim 1, further comprising making a given area executable and switching execution to the given area.

6. A non-transitory computer-readable storage medium with program code for training a machine-learning static analyzer based on iterative executable file analysis by way of the following steps comprising:
   a. retrieving file attributes from an untrusted file;
   b. creating an attributes tree of the file attributes of the untrusted file;
   c. performing iteration of dynamic analysis of the untrusted the by:
      intercepting an operation of decrypting at least one encrypted data block during an execution of the untrusted file's code; and
      updating the tree of the file attributes for the untrusted file based on the at least one decrypted data block;
   d. repeating step (c) until the file's code has been executed;
   e. training the machine learning static analyzer based on the updated file attributes tree of the untrusted file and a classified files collection;
   f. analyzing the untrusted file and a second untrusted file, wherein the second untrusted file was modified from the untrusted file after the execution; and
   g. repeating the steps of intercepting and updating at least three times, wherein updating at least three times expands the file attributes tree with six additional attributes for analysis.

7. The non-transitory computer readable storage medium of claim 6, further comprising decrypting data blocks of the untrusted file in new or existing memory.

8. The non-transitory computer-readable storage medium of claim 7, further comprising the step of freezing the execution of the untrusted the following analysis of additional file data.

* * * * *